US009221123B2

(12) United States Patent
Sakai et al.

(10) Patent No.: US 9,221,123 B2
(45) Date of Patent: Dec. 29, 2015

(54) LASER PROCESSING APPARATUS AND CONTAINER MANUFACTURING APPARATUS

(75) Inventors: Tatsuhiko Sakai, Tokyo (JP); Hirokazu Yokoya, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 397 days.

(21) Appl. No.: 13/261,148

(22) PCT Filed: Jul. 27, 2010

(86) PCT No.: PCT/JP2010/062625
§ 371 (c)(1),
(2), (4) Date: Jan. 19, 2012

(87) PCT Pub. No.: WO2011/013666
PCT Pub. Date: Feb. 3, 2011

(65) Prior Publication Data
US 2012/0121749 A1    May 17, 2012

(30) Foreign Application Priority Data

Jul. 28, 2009   (JP) .................................. 2009-174925

(51) Int. Cl.
*B23K 26/08* (2014.01)
*B23K 26/361* (2014.01)
*B23K 26/36* (2014.01)
*B23K 26/40* (2014.01)

(52) U.S. Cl.
CPC ........... *B23K 26/0823* (2013.01); *B23K 26/362* (2013.01); *B23K 26/367* (2013.01); *B23K 26/409* (2013.01); *B23K 2201/12* (2013.01)

(58) Field of Classification Search
CPC .......................... B23K 26/0823; B23K 26/362
See application file for complete search history.

(56) References Cited

U.S. PATENT DOCUMENTS

| 5,105,645 | A |   | 4/1992 | Kobayashi et al. |
|---|---|---|---|---|
| 5,622,567 | A | * | 4/1997 | Kojima et al. ................ 118/726 |
| 5,778,722 | A |   | 7/1998 | Saiki et al. |
| 5,855,802 | A | * | 1/1999 | Acciai et al. ....................... 216/8 |
| 6,934,014 | B1 | * | 8/2005 | Kleinhuber ..................... 356/72 |
| 8,658,937 | B2 | * | 2/2014 | Harte et al. |

(Continued)

FOREIGN PATENT DOCUMENTS

| JP | 60-11576 | 3/1985 |
|---|---|---|
| JP | 03-155419 | 7/1991 |

(Continued)

OTHER PUBLICATIONS

Nishida et al., JP 2005-296998 A, Oct. 2005, Machine Translation.*

(Continued)

*Primary Examiner* — Ryan Ochylski
(74) *Attorney, Agent, or Firm* — Kenyon & Kenyon LLP

(57) ABSTRACT

A laser processing apparatus includes: a reflection mirror (1, 4) reflecting a laser beam (LA, LB) to an inner or outer surface at an upper edge portion (14*a*) of a cup (14); a reflection mirror (2, 5) reflecting a part that has passed an outer side of the upper edge portion (14*a*), of the laser beam (LA, LB) reflected by the reflection mirror (1, 4), to an outer or inner surface of the cup (14); and a rotating pedestal (15) rotating the cup (14) around its center relative to the reflection mirror (1, 4) and the reflection mirror (2, 5).

22 Claims, 14 Drawing Sheets

(56) References Cited

U.S. PATENT DOCUMENTS

| | | |
|---|---|---|
| 2001/0019074 A1 | 9/2001 | Shirai et al. |
| 2011/0168672 A1* | 7/2011 | Harte et al. .................. 216/65 |

FOREIGN PATENT DOCUMENTS

| | | |
|---|---|---|
| JP | 06-210381 | 8/1994 |
| JP | 07-275961 | 10/1995 |
| JP | 07-290258 | 11/1995 |
| JP | 08-019139 | 1/1996 |
| JP | 09-095657 | 4/1997 |
| JP | 2000-167625 | 6/2000 |
| JP | 2001-246487 | 9/2001 |
| JP | 2001-252778 | 9/2001 |
| JP | 2005-296998 | 10/2005 |
| JP | 2006-26671 | 2/2006 |
| JP | 2006-247681 | 9/2006 |
| JP | 2006-255744 | 9/2006 |
| JP | 2007-112126 | 5/2007 |

OTHER PUBLICATIONS

International Preliminary Report on Patentability dated Feb. 16, 2012 issued in corresponding PCT Application No. PCT/JP2010/062625.
International Search Report dated Oct. 26, 2010 issued in corresponding PCT Application No. PCT/JP2010/062625.

* cited by examiner

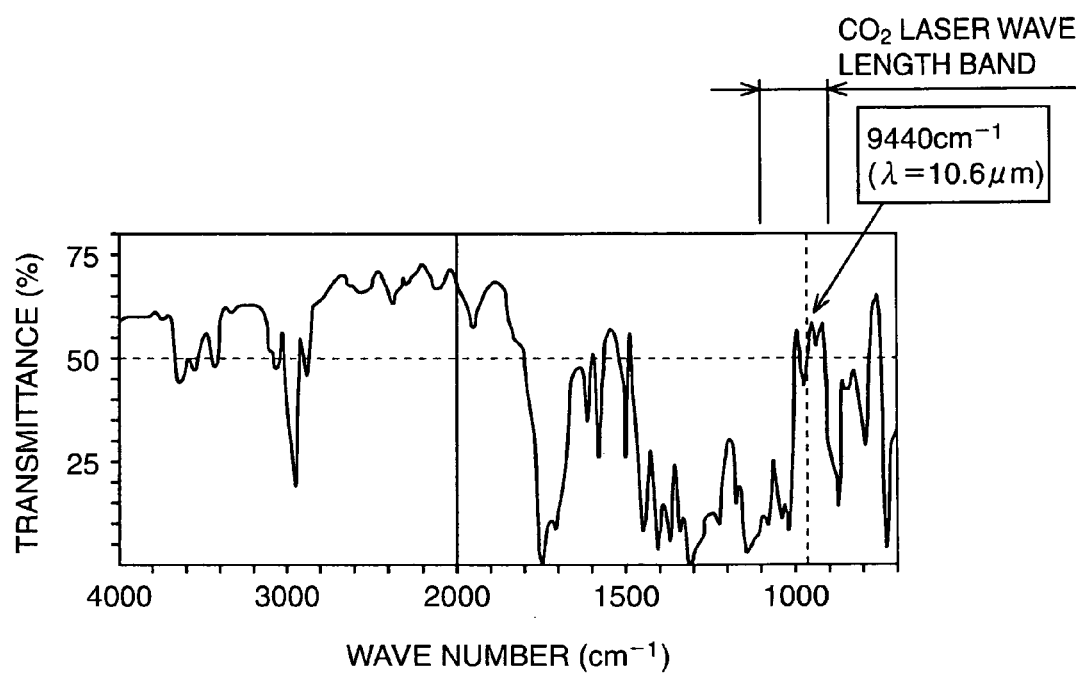

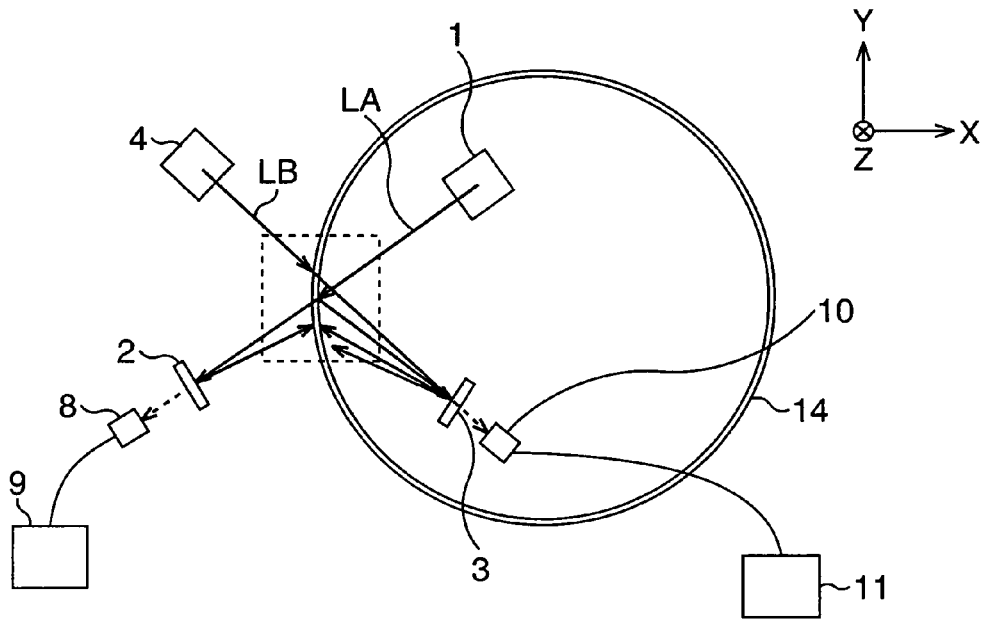
FIG. 5A
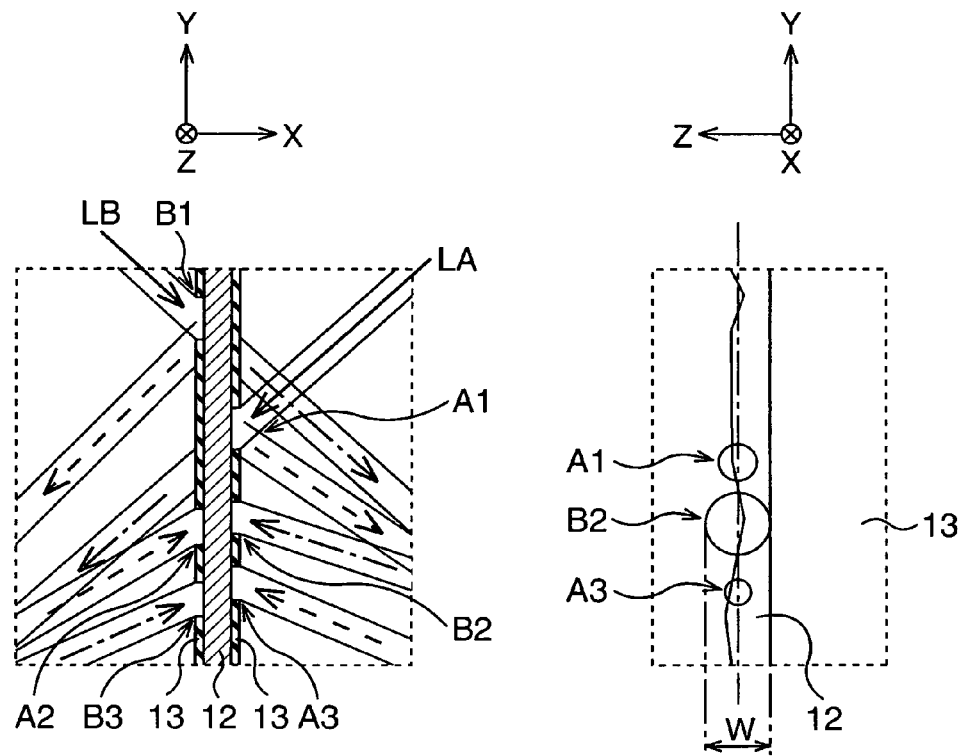
FIG. 5B
FIG. 5C

FIG. 6A
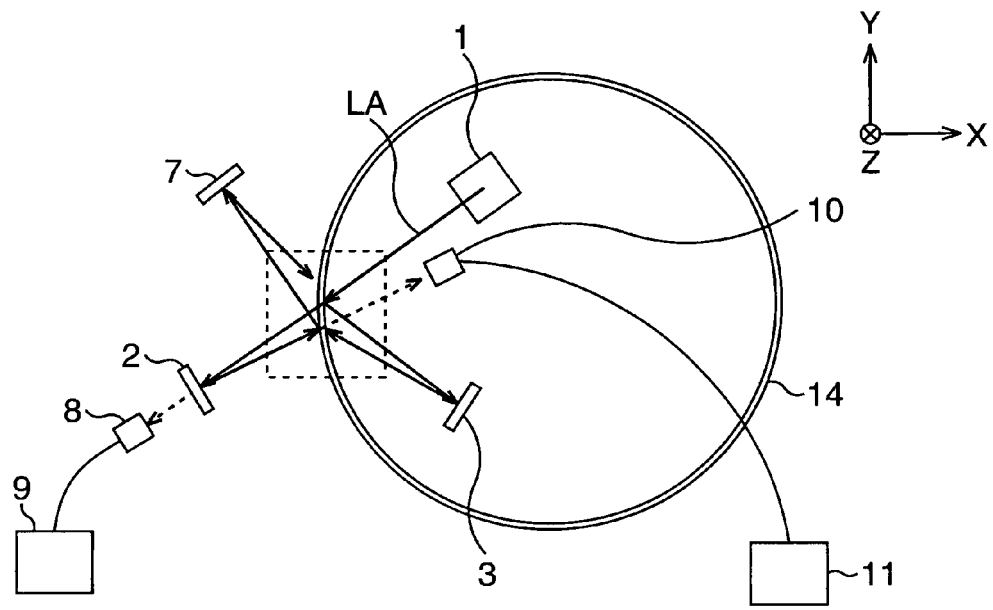
FIG. 6B
FIG. 6C
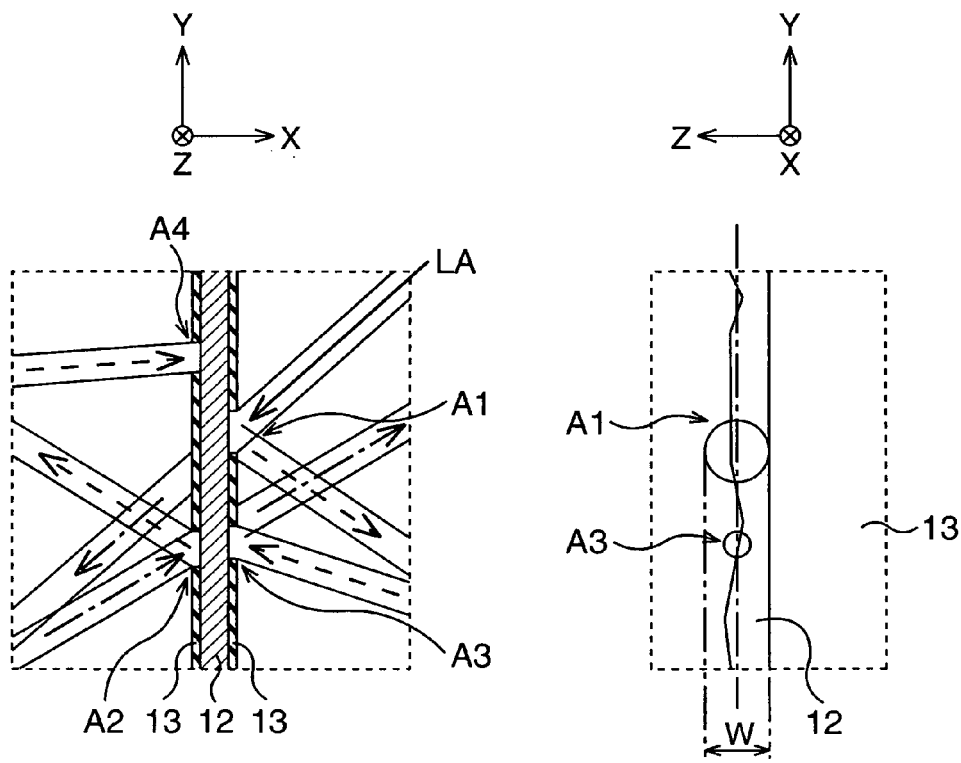

FIG. 8
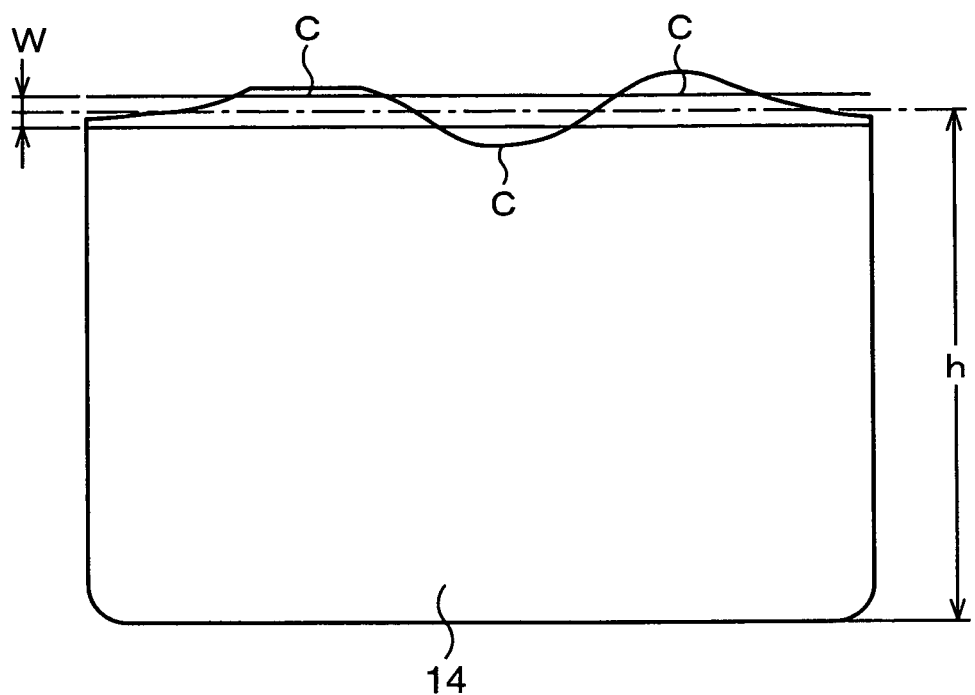
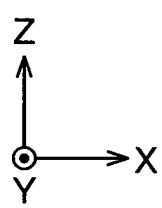

LASER PROCESSING APPARATUS AND CONTAINER MANUFACTURING APPARATUS

This application is a national stage application of International Application No. PCT/JP2010/062625, filed 27 Jul. 2010, which claims priority to Japanese Application No. 2009-174925 filed 28 Jul. 2009, which is incorporated by reference in its entirety.

TECHNICAL FIELD

The present invention relates to a laser processing apparatus and a container manufacturing apparatus suitable for preventing resin hairs from being generated when a cylindrical container is manufactured from a primary drawn material or the like of a metal plate having resin films on its both surfaces.

BACKGROUND ART

As a beverage can, a food can, and so on, there have conventionally been used containers (seamless cans) such as a drawn can (Patent Literature 1), a thinned redrawn can (Patent Literatures 2, 3), and a thinned redrawn-ironed can (for example, refer to Patent Literature 4). In the manufacture of these containers, a disk-shaped blank is first punched out from a plate material in which resin films are formed on one surface or both surfaces of a metal plate, and the blank is drawn, whereby a cylindrical primary drawn material (hereinafter, sometimes referred to as a "cup") is formed. Next, the cup is redrawn and ironed.

In this method, mainly at the time of the redrawing and the ironing, the resin films at an edge portion of the blank are stretched, which is likely to cause the generation of hairy film pieces (hereinafter, sometimes referred to as "resin hairs") (Patent Literature 6). Normally, the resin hairs have a length of about 10 mm or more. Then, the resin hairs sometimes exfoliate from the edge portion and adhere on an inner surface of the container to remain thereon. The resin hairs, though harmless to human bodies, are suspected as an unsanitary matter by consumers when mixed in the can, which can be a target of complaint. Therefore, when the generation of the resin hairs is confirmed during the manufacture of the container, all the products of the corresponding lot or the like are sometimes discarded. Thus, the generation of the resin hairs can have a great influence on a reduction in yield.

Under such circumstances, various arts aiming at the prevention of the generation of the resin hairs have been proposed (Patent Literatures 5 to 7). Patent Literature 5 describes an art relating to a method of punching out a blank from a plate material, and Patent Literatures 6 and 7 describe arts for removing part of resin films with a laser beam.

However, the art described in Patent Literature 5 is not capable of sufficiently preventing the generation of the resin hairs.

Further, according to the art described in Patent Literature 6 or 7, though the desired object is attained, its efficiency cannot be said to be high because an amount of the resin films that can be removed is not large, considering an energy amount required for the irradiation of the laser beam.

CITATION LIST

Patent Literature

Patent Literature 1: Japanese Examined Patent Application Publication No. 60-11576
Patent Literature 2: Japanese Laid-open Patent Publication No. 03-155419
Patent Literature 3: Japanese Laid-open Patent Publication No. 06-210381
Patent Literature 4: Japanese Laid-open Patent Publication No. 07-275961
Patent Literature 5: Japanese Laid-open Patent Publication No. 2000-167625
Patent Literature 6: Japanese Laid-open Patent Publication No. 2005-296998
Patent Literature 7: Japanese Laid-open Patent Publication No. 2006-26671
Patent Literature 8: Japanese Laid-open Patent Publication No. 07-290258

SUMMARY OF INVENTION

Technical Problem

It is an object of the present invention to provide a laser processing apparatus and a container manufacturing apparatus capable of processing a cylinder such as a cup with using a laser beam highly efficiently.

Solution to Problem

Here, a relation between a laser beam and the removal of a resin film will be described. When a laser beam is irradiated to a resin film, the laser beam is absorbed by the resin film and the resin film is heated. Then the temperature of the resin film increases and part of the resin film evaporates and scatters. Part of the resin film is removed in this manner. However, the resin film transmits most of the laser beam as illustrated in FIG. 1. FIG. 1 is a graph representing a light wavelength transmission characteristic of a polyethylene terephthalate (PET) resin film with a 20 µm thickness. PET resin has a property of absorbing energy in an infrared wavelength band, and a $CO_2$ laser outputting a laser beam in a wavelength band of about 9 µm to 11 µm is suitable for removing a PET resin film. However, even in such a suitable combination, about 20% to 50% of the laser beam transmits through the PET resin film as illustrated in FIG. 1, and energy corresponding to this is wasted.

Further, the present inventors have found out that, at the time of removing a resin film with a laser beam, the laser beam reflected by an inner surface of a cup may impair the inside of the cup. Specifically, as illustrated in FIG. 2A and FIG. 2B, when, for example, a laser beam LX is irradiated to an upper edge portion of a cup 114 via beam scanning mirrors 118, the laser beam LX reflected by an inner surface of the cup 114 is sometimes irradiated up to a bottom or the like of the cup 114. In this case, the irradiation of the laser beam LX causes a damage portion 119 on the bottom or the like of the cup 114.

The present inventors have devised the following various embodiments based on the above findings.

A laser processing apparatus according to a first aspect of the present invention is characterized in that it includes: a first laser beam irradiator irradiating a laser beam to an inner or an outer surface at an end portion of a cylinder; a first reflector reflecting a part that has passed an outer side of the end portion, of the laser beam irradiated by the first laser beam irradiator, to an outer or inner surface of the cylinder; and a rotator rotating the cylinder around a center of the cylinder relative to the first laser beam irradiator and the first reflector.

A laser processing apparatus according to a second aspect of the present invention is characterized in that, in the first aspect, it includes a second reflector reflecting the laser beam irradiated to the inner or outer surface by the first laser beam irradiator and reflected by the inner or outer surface, to the inner or outer surface at the end portion.

A laser processing apparatus according to a third aspect of the present invention is characterized in that, in the first aspect, it includes: a second laser beam irradiator irradiating a laser beam to the outer or inner surface at the end portion of the cylinder; and a third reflector reflecting a part that has passed the outer side of the end portion, of the laser beam irradiated by the second laser beam irradiator, to the inner or outer surface of the cylinder.

A laser processing apparatus according to a fourth aspect of the present invention is characterized in that, in the third aspect, it includes: a second reflector reflecting the laser beam irradiated to the inner or outer surface by the first laser beam irradiator and reflected by the inner or outer surface, to the inner or outer surface at the end portion; and a fourth reflector reflecting the laser beam irradiated to the outer or inner surface by the second laser beam irradiator and reflected by the outer or inner surface, to the outer or inner surface at the end portion.

A laser processing apparatus according to a fifth aspect of the present invention is characterized in that, in the first aspect, it includes a second laser beam irradiator irradiating a laser beam to the outer or inner surface at the end portion of the cylinder, wherein the first reflector also reflects the laser beam irradiated to the outer or inner surface by the second laser beam irradiator and reflected by the outer or inner surface, to the outer or inner surface at the end portion.

A laser processing apparatus according to a sixth aspect of the present invention is characterized in that, in the fifth aspect, it includes a fifth reflector which reflects the laser beam irradiated to the inner or outer surface by the first laser beam irradiator and reflected by the inner or outer surface, to the inner or outer surface at the end portion; and reflects a part that has passed the outer side of the end portion of the cylinder, of the laser beam irradiated by the second laser beam irradiator, to the inner or outer surface of the cylinder.

A laser processing apparatus according to a seventh aspect of the present invention is characterized in that, in any one of the first to sixth aspects, it includes a sixth reflector reflecting the laser beam reflected to the outer or inner surface of the cylinder by the first reflector and reflected by the outer or inner surface, to the outer or inner surface at the end portion.

A laser processing apparatus according to an eighth aspect of the preset invention is characterized in that, in any one of the first to seventh aspects, the first reflector is a concave mirror, and the concave mirror is disposed so as to cause a focal point of the reflection laser beam reflected by the concave mirror to be located between the concave mirror and an irradiation target portion on the outer or inner surface of the cylinder.

A laser processing apparatus according to a ninth aspect of the present invention is characterized in that, in any one of the first to eighth aspects, it includes an absorber absorbing the laser beam that travels toward a light source of the first laser beam irradiator after irradiated to the inner or outer surface by the first laser beam irradiator.

A laser processing apparatus according to a tenth aspect of the present invention is characterized in that, in any one of the first to ninth aspects, the first reflector is a partial reflection mirror transmitting part of the incident laser beam, and that the laser processing apparatus comprises a light detector measuring a light intensity of the transmission laser beam transmitted by the partial reflection mirror.

A container manufacturing apparatus according to an eleventh aspect of the present invention is characterized in that it includes the laser processing apparatus according to any of the first to tenth aspects, wherein the cylinder is a cylindrical cup made of a metal plate having resin films on both surfaces, and the laser beam is irradiated to the resin film at the upper edge portion of a side surface of the cup to evaporate the resin films at an upper edge portion.

Advantageous Effects of Invention

According to the present invention, part of a laser beam irradiated to an end portion of a cylinder can be irradiated to another end portion again. Therefore, it is possible to irradiate the laser beam highly efficiently to the end portion of the cylinder. Therefore, when the cylinder has resin films formed on its inner surface and outer surface, it is possible to remove the resin films with using the laser beam highly efficiently.

BRIEF DESCRIPTION OF DRAWINGS

FIG. 1 is a graph representing a light wavelength transmission characteristic of a resin film.

FIG. 5A is a plane view of a second embodiment seen from an upper side of a cup 14.

FIG. 5B is an enlarged plane view illustrating irradiation target portions in FIG. 5A.

FIG. 5C is an enlarged side view illustrating the irradiation target portions in FIG. 5A.

FIG. 6A is a plane view of a third embodiment seen from an upper side of a cup 14.

FIG. 6B is an enlarged plane view illustrating irradiation target portions in FIG. 6A.

FIG. 6C is an enlarged side view illustrating the irradiation target portions in FIG. 6A.

FIG. 8 is a side view of the cup 14 seen from its side surface.

DESCRIPTION OF EMBODIMENTS

Hereinafter, a laser processing apparatus (container manufacturing apparatus) according to embodiments of the present invention will be described in detail with reference to the attached drawings. Note that in the description and the drawings, constituent elements having substantially the same function and structure will be denoted by the same reference signs and redundant description thereof will be omitted.

First Embodiment

Figure 3:
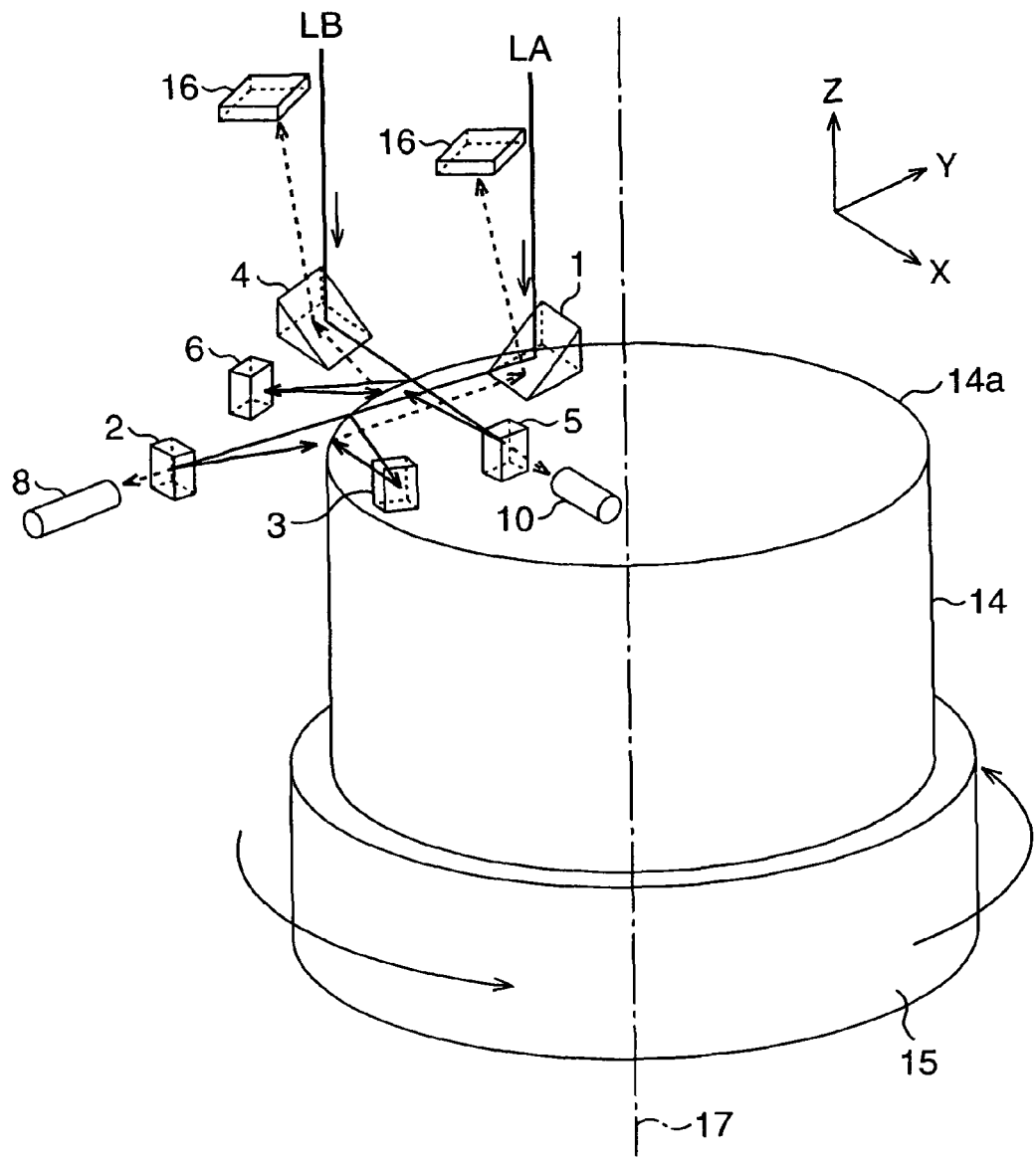
FIG. 3 is view illustrating a laser processing apparatus according to a first embodiment of the present invention.
Figure 4A:
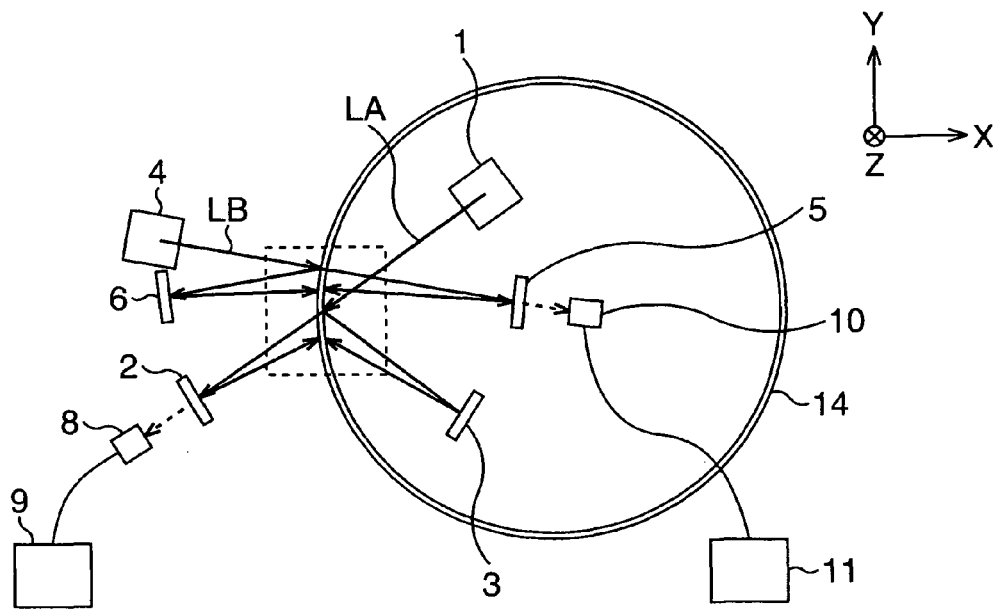
FIG. 4A is a plane view of the first embodiment seen from an upper side of a cup 14.
Figure 4B:
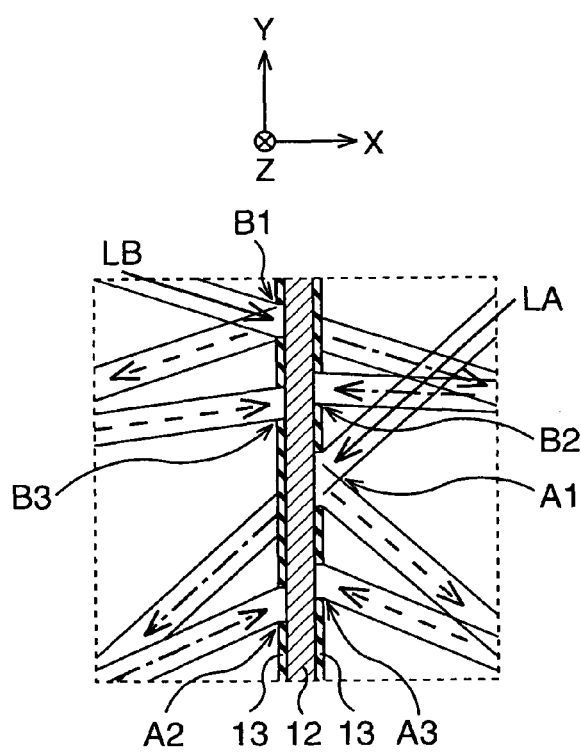
FIG. 4B is an enlarged plane view illustrating irradiation target portions in FIG. 4A.
Figure 4C:
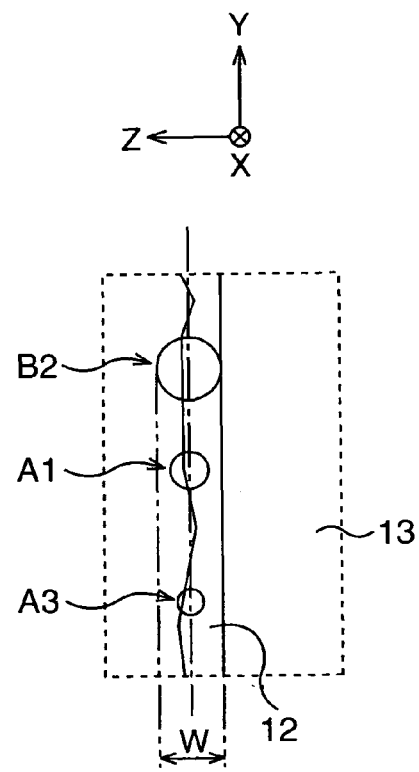
FIG. 4C is an enlarged side view illustrating the irradiation target portions in FIG. 4A.

First, a first embodiment will be described. FIG. 3 is a view illustrating a laser processing apparatus (container manufacturing apparatus) according to the first embodiment of the present invention, and is a perspective view thereof seen from a diagonally upper side of a cup 14 being a material to be processed. Further, FIG. 4A is a plane view seen from an upper side of the cup 14, FIG. 4B is an enlarged plane view illustrating irradiation target portions to which laser beams LA and LB are irradiated, at an upper edge portion 14a of the cup 14, and FIG. 4C is an enlarged side view illustrating the irradiation target portions. Note that as for the coordinates illustrated in FIG. 3 and FIG. 4A to FIG. 4C, a radius direction of the cup 14 is an X direction, a tangent direction of the cup 14 is a Y direction, and a rotation axis direction of the cup 14 is a Z direction.

In the first embodiment, a rotating pedestal 15 on which the cup 14 is fixed is provided as illustrated in FIG. 3 and FIG. 4A to FIG. 4C. The rotating pedestal 15 is rotatable at a high speed around a rotation axis 17. Therefore, when a center of the cylindrical cup 14 is aligned with the rotation axis 17, the cup 14 rotates around the center. It should be noted that the rotation speed of the rotating pedestal 15 is not particularly limited. As the cup 14, used is, for example, one worked from a plate material whose parent metal 12 has resin films 13 formed on its both surfaces.

Further, in the first embodiment, a first reflection mirror 1 is provided that reflects the laser beam LA output from a light source (not illustrated) of, for instance, a $CO_2$ laser device and focused by a focusing lens (not illustrated), to a first irradiation target portion A1 on an inner surface at the upper edge portion 14a of the cup 14. There is also provided a first' reflection mirror 4 that reflects a laser beam LB output from a light source (not illustrated) of a $CO_2$ laser device and focused by a focusing lens (not illustrated) to a first' irradiation target portion B1 on an outer surface at the upper edge portion 14a of the cup 14. Incidentally, the light source for the laser beam LA and the light source for the laser beam LB may be separately provided. Alternatively, a laser beam output from one light source may be split by a beam splitting mirror or the like and the resultant beams may be used as the laser beams LA and LB. Further, the focusing lens for the laser beam LA and the focusing lens for the laser beam LB may also be provided separately. Further, when the laser beam output from one light source is split, one focusing lens may be provided on a preceding stage of the splitting. In the first embodiment, these optical systems correspond to a first or a second laser beam irradiator.

Further, a second reflection mirror 2 is disposed at a position opposite the first reflection mirror 1 across the first irradiation target portion A1, and a second' reflection mirror 5 is disposed at a position opposite the first' reflection mirror 4 across the first' irradiation target portion B1. In the first embodiment, the second reflection mirror 2 and the second' reflection mirror 5 correspond to a first or a third reflector. The second reflection mirror 2 is adjusted so that the laser beam reflected by the second reflection mirror 2 is irradiated to a second irradiation target portion A2 on the outer surface at the upper edge portion 14a. Similarly, the second' reflection mirror 5 is adjusted so that the laser beam reflected by the second' reflection mirror 5 is irradiated to a second' irradiation target portion B2 on the inner surface at the upper edge portion 14a.

Further, a third reflection mirror 3 is disposed in a path of the laser beam reflected by the parent metal 12 at the first irradiation target portion A1, and a third' reflection mirror 6 is disposed in a path of the laser beam reflected by the parent metal 12 at the first' irradiation target portion B1. In the first embodiment, the third reflection mirror 3 and the third' reflection mirror 6 correspond to a second or a fourth reflector. The third reflection mirror 3 is adjusted so that the laser beam reflected by the third reflection mirror 3 is irradiated to a third irradiation target portion A3 on the inner surface at the upper edge portion 14a. Similarly, the third' reflection mirror 6 is adjusted so that the laser beam reflected by the third' reflection mirror 6 is irradiated to a third' irradiation target portion B3 on the outer surface at the upper edge portion 14a.

Further, laser absorbing parts 16 are disposed on a side, of the first reflection mirror 1 and the first' reflection mirror 4, toward the focusing lenses of the laser beams LA and LB. The laser absorbing parts 16 are each disposed at a position where it absorbs the laser beam LA or LB traveling toward the light source without obstructing the laser beam LA or LB traveling toward the first reflection mirror 1 and the first' reflection mirror 4 from the light source.

Note that the second reflection mirror 2 and the second' reflection mirror 5 are partial reflection mirrors transmitting part of the laser beams incident thereon, and a laser light-receiving element 8 detecting an intensity of the laser beam LA having transmitted through the second reflection mirror 2 and a laser light-receiving element 10 detecting an intensity of the laser beam LB having transmitted through the second' reflection mirror 5 are provided. There are further provided a non-irradiation detecting part 9 detecting that the laser beam LA is not irradiated to the second reflection mirror 2 according to the detection result by the laser light-receiving element 8 and a non-irradiation detecting part 11 detecting that the laser beam LB is not irradiated to the second' reflection mirror 5 according to the detection result by the laser light-receiving element 10.

Next, an operation of the laser processing apparatus thus structured will be described.

The laser beams LA and LB output from the light sources and focused by the focusing lenses are first reflected by the first reflection mirror 1 and the first' reflection mirror 4. Then, the laser beams LA and LB are irradiated to the first irradiation target portion A1 (inner surface) and the first' irradiation target portion B1 (outer surface) respectively. As a result, parts, of the resin films 13, irradiated with the laser beams LA, LB, evaporate to be removed.

Further, part of the laser beam LA, LB travels beyond the upper edge portion 14a, that is, passes an outer side of the first irradiation target portion A1 or the first' irradiation target portion B1 to be guided to the second reflection mirror 2 or the second' reflection mirror 5. Then, the laser beam LA, LB guided to the second reflection mirror 2 or the second' reflection mirror 5 is reflected by the second reflection mirror 2 or the second' reflection mirror 5 to be irradiated to the second irradiation target portion A2 (outer surface) or the second' irradiation target portion B2 (inner surface). As a result, part of the resin film 13, irradiated with the laser beam LA, LB evaporates to be removed.

Further, part of the laser beam LA, LB is reflected by a front surface of the parent metal 12 without being absorbed by the resin film 13 even though irradiated to the first irradiation target portion A1 or the first' irradiation target portion B1, and is guided to the third reflection mirror 3 or the third' reflection mirror 6. Then, the laser beam LA, LB guided to the third reflection mirror 3 or the third' reflection mirror 6 is reflected by the third reflection mirror 3 or the third' reflection mirror 6 to be irradiated to the third irradiation target portion A3 (inner surface) or the third' irradiation target portion B3 (outer surface). As a result, part of the resin film 13, irradiated with the laser beam LA, LB evaporates to be removed.

Then, when the cup 14 is rotated around its center by the rotating pedestal 15, the resin film 13 at the upper edge portion 14a is removed along the whole periphery of the cup 14. Further, the reflection of the laser beams LA and LB is sometimes repeated between the upper edge portion 14a and the reflection mirrors.

As described above, in this embodiment, since the laser beams LA and LB are each irradiated to a plurality of places of the upper edge portion 14a, it is possible to remove the resin film 13 highly efficiently. That is, compared with a case where reflection lights of the laser beams LA and LB are not used, it is possible to greatly improve a ratio of the contribution to the removal of the resin film 13, which makes it possible to surely remove the resin film 13 even when the energies of the laser beams LA and LB output from the light sources are lowered.

Further, even if part of the laser beam LA, LB returns to the first reflection mirror 1 or the first' reflection mirror 4, it is guided to the laser absorbing part 16 to be absorbed by the laser light absorbing part 16. Therefore, it is possible to prevent the irradiation to a portion, of the cup 14, not requiring the laser irradiation due to the irradiation of the laser beam LA, LB. Incidentally, as the laser light absorbing part 16, usable is, for example, a metal plate, a ceramic plate, or the like whose surface is coated with black color in order to absorb the laser light. Further, a water-cooled tube may be disposed for cooling in order to prevent overheating or the like when necessary.

Incidentally, the positions of the second irradiation target portion A2 and the second' irradiation target portion B2 may be adjusted by mechanisms (not illustrated) that are provided in the second reflection mirror 2 and the second' reflection mirror 5 to adjust reflection angles thereof. The positions of the third irradiation target portion A3 and the third' irradiation target portion B3 may be adjusted by, for example, mechanisms (not illustrated) that are provided in the third reflection mirror 3 and the third' reflection mirror 6 to adjust reflection angles thereof. In FIG. 4C, Y coordinates of centers of the first irradiation target portion A1, the second' irradiation target portion B2, and the third irradiation target portion A3 on the outer surface of the cup 14 are made different while their Z coordinates are made substantially equal. Therefore, in accordance with the rotation of the cup 14, the laser irradiation is performed at the same position in the Z direction at the upper edge portion 14a totally three times during one rotation. Further, a irradiation width W in the Z direction at this time corresponds to the largest diameter out of diameters of the laser beams irradiated to the three irradiation target portions. This also applies to the inner surface of the cup 14. Note that the diameter of the laser beam refers to the diameter of a portion including 86.5% of the laser energy as is commonly said.

Incidentally, the Y coordinates of the first to third irradiation target portions A1 to A3 may be aligned with one another by the aforesaid mechanism for adjusting the reflection angles. Also adoptable is a structure that their Z coordinates are also aligned with one another so that the first and third irradiation target portions A1, A3 overlap with each other, with the second irradiation target portion A2 located on inner side therebetween. When such a structure is adopted, it is also possible to greatly improve a ratio of the contribution to the removal of the resin film 13, compared with the case where the reflection light of the laser beam LA is not used. This also applies to the first' to third' irradiation target portions B1 to B3 and the laser beam LB.

Figure 4D:
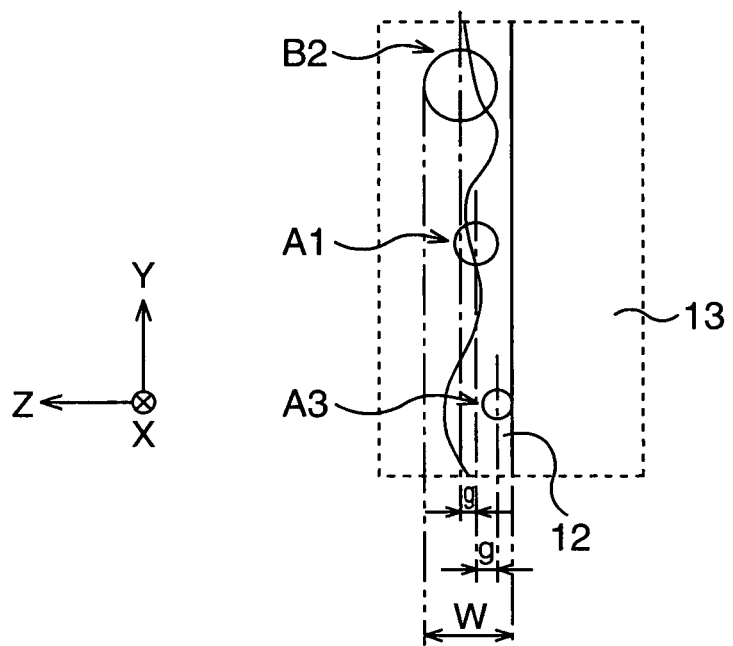
FIG. 4D is an enlarged side view illustrating another example of the irradiation target portions in FIG. 4A.
Figure 4E:
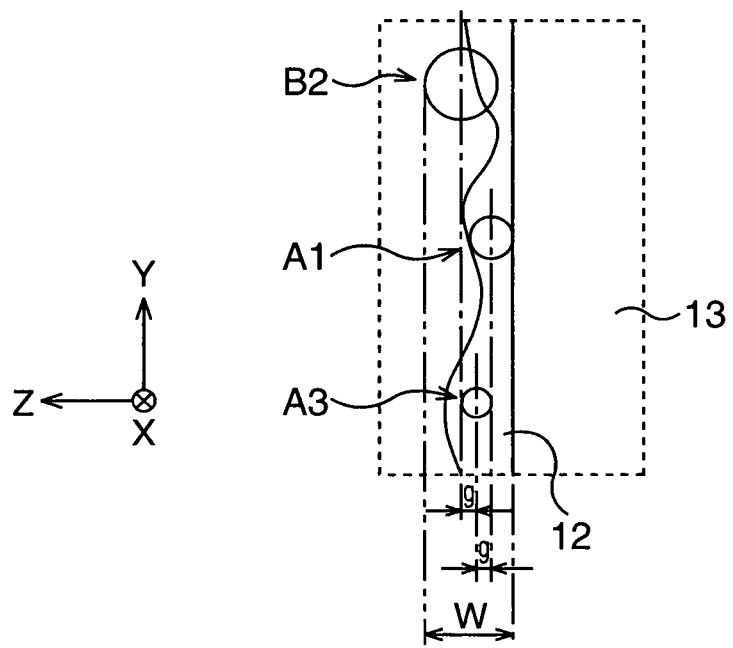
FIG. 4E is an enlarged side view illustrating still another example of the irradiation target portions in FIG. 4A.

Further, as illustrated in FIG. 4D, the Z coordinates of the centers of the first irradiation target portion A1, the second' irradiation target portion B2, and the third irradiation target portion A3 on the outer surface of the cup 14 may be made different. Here, a difference between the Z coordinates of the centers of two irradiation target portions adjacent in the Z direction (Z-direction interval) is represented as g, and the sum of the radii of the laser beams irradiated to these two adjacent irradiation target portions is represented as Rs. In this case, when a relation of "$0<g\leq Rs$" is satisfied, the two adjacent irradiation target portions necessarily overlap with each other in the Z direction, and therefore, the laser beam is irradiated to the whole range of the irradiation width W and a portion not irradiated with the laser beam does not occur in the range of the irradiation width W. Further, when the Z-direction interval g is made larger than an absolute value of a difference in the radius between the two irradiation target portions, the irradiation width obtained by these two irradiation target portions becomes larger than the larger one of the diameters of the laser beams irradiated to these two irradiation target portions. Therefore, adjusting the reflection angle so that the Z-direction interval g satisfies these two conditions makes it possible to irradiate the laser beam to a wider range in terms of the Z direction. Therefore, even when there is a large variation in height of the upper edge portion 14a of the cup 14, it is possible to make it difficult for an area not irradiated with the laser beam to occur in the upper edge portion 14a. This is apparent from the comparison with the example illustrated in FIG. 4C where the Z-direction interval g is zero. It is a matter of course that, with regard to the Z-direction interval g, the combination of the two irradiation target portions adjacent in the Z direction not only includes the combination of the irradiation target portions which are adjacent also in the Y direction such as the combination of the irradiation target portions B2 and A1 in FIG. 4D and the combination of the irradiation target portions A1 and A3 in FIG. 4D but also the combination of the irradiation target portions which are not adjacent in the Y direction such as the combination of the irradiation target portions B2 and A3 in FIG. 4E.

Details of the laser light-receiving elements 8 and 10 and the non-irradiation detecting parts 9 and 11 will be described later.

Second Embodiment

Next, a second embodiment will be described. FIG. 5A is a plane view of a laser processing apparatus according to the second embodiment seen from an upper side of a cup 14, FIG. 5B is an enlarged plane view illustrating irradiation target portions irradiated with laser beams LA and LB at an upper edge portion 14a of the cup 14, and FIG. 5C is an enlarged side view illustrating the irradiation target portions.

In the second embodiment, as illustrated in FIG. 5A to FIG. 5C, a first reflection mirror 1, a second reflection mirror 2, a third reflection mirror 3, and a first' reflection mirror 4 are disposed and their reflection angles are adjusted so that the following relation is satisfied.

(a) The laser beam LA is reflected by the first reflection mirror 1 to be guided to a first irradiation target portion A1.

(b) The laser beam LB is reflected by the first' reflection mirror 4 to be guided to a first' irradiation target portion B1.

(c) Part, of the laser beam LA, traveling beyond the first irradiation target portion A1 is reflected by the second reflection mirror 2 to be guided to a second irradiation target portion A2.

(d) Part, of the laser beam LB, traveling beyond the first' irradiation target portion B1 is reflected by the third reflection mirror 3 to be guided to a second' irradiation target portion B2.

(e) The laser beam LA reflected at the first irradiation target portion A1 is guided to the third reflection mirror 3 and reflected by the third reflection mirror 3 to be guided to a third irradiation target portion A3.

(f) The laser beam LB reflected at the first' irradiation target portion B1 is guided to the second reflection mirror 2 and reflected by the second reflection mirror 2 to be guided to a third' irradiation target portion B3.

On the other hand, the second's reflection mirror 5 and the third' reflection mirror 6 provided in the first embodiment are not provided. In the second embodiment, the second reflection mirror 2 and the third reflection mirror 3 correspond to a first or a fifth reflector.

According to the second embodiment, it is possible to make the number of the reflection mirrors smaller than that in the first embodiment yet obtain the same effect as that of the first embodiment.

Note that, even when one of the second reflection mirror 2 and the third reflection mirror 3 is not provided, the laser beams LA and LB can be reflected by the other and thus use efficiency of the laser beams can be improved.

Third Embodiment

Next, a third embodiment will be described. FIG. 6A is a plane view of a laser processing apparatus according to the third embodiment seen from an upper side of a cup 14, FIG. 6B is an enlarged plane view illustrating irradiation target portions irradiated with laser beams LA and LB at an upper edge portion 14a of the cup 14, and FIG. 6C is an enlarged side view illustrating the irradiation target portions.

In the third embodiment, as illustrated in FIG. 6A to FIG. 6C, a first reflection mirror 1, a second reflection mirror 2, and a third reflection mirror 3 are disposed in the same manner as in the first embodiment. There is further provided a fourth reflection mirror 7 further reflecting a laser beam LA reflected at a second irradiation target portion A2 to guide the laser beam LA to a fourth irradiation target portion A4 (outer surface). In the third embodiment, the fourth reflection mirror 7 corresponds to a sixth reflector. Further, a laser light-receiving element 10 is disposed so as to detect an intensity of the laser beam LA traveling beyond the second irradiation target portion A2. On the other hand, the members having the functions involved in the reflection of the laser beam LB, which are provided in the first embodiment, are not provided.

In the third embodiment as structured above, the laser beam LA is first reflected by the first reflection mirror 1. Then, the laser beam LA is irradiated to a first irradiation target portion A1. Further, part of the laser beam LA travels beyond the upper edge portion 14a to be guided to the second reflection mirror 2. Then, the laser beam LA guided to the second reflection mirror 2 is reflected by the second reflection mirror 2 to be irradiated to the second irradiation target portion A2. Further, part of the laser beam LA, even though irradiated to the second irradiation target portion A2, is reflected by a front surface of a parent metal 12 without absorbed by a resin film 13, and is guided to the fourth reflection mirror 7. Then, the laser beam LA guided to the fourth reflection mirror 7 is reflected by the fourth reflection mirror 7 to be irradiated to the fourth irradiation target portion A4. As a result, at the fourth irradiation target portion A4, part, of the resin film 13, irradiated with the laser beam LA also evaporates to be removed. Further, part of the laser beam LA, even though irradiated to the first irradiation target portion A1, is reflected by the front surface of the parent metal 12 without absorbed by the resin film 13, and is guided to the third reflection mirror 3. Then, the laser beam LA guided to the third reflection mirror 3 is reflected by the third reflection mirror 3 to be irradiated to a third irradiation target portion A3.

Further, the reflection of the laser beam LA is sometimes repeated between the upper edge portion 14a and the reflection mirrors. Thereafter, even when part of the laser beam LA returns to the first reflection mirror 1, it is guided to a laser light absorbing part 16 to be absorbed by the laser light absorbing part 16.

According to the third embodiment, it is possible to remove the resin film 13 with high efficiency similarly to the first embodiment, even though only one laser beam is used. That is, compared with the case where reflection light of the laser beam LA is not used, it is possible to greatly improve a ratio of the contribution to the removal of the resin film 13, which makes it possible to surely remove the resin film 13 even when energy of the laser beam LA output from a light source is lowered. Further, it is possible to adjust an irradiation width W similarly to the first embodiment even though only one laser beam is used, which can make it difficult for an area not irradiated with the laser beam to occur at the upper edge portion 14a.

Incidentally, in the third embodiment, the laser beam LA is irradiated from the light source to an inner side of the cup 14, but a laser beam LB may be irradiated to an outer side of the cup 14 and accordingly, three reflection mirrors may be disposed so as to cause the similar reflection.

The fourth reflection mirror 7 may be further provided in the first or second embodiment.

(Mechanism for Adjusting Reflection Angle)

Figure 7A:
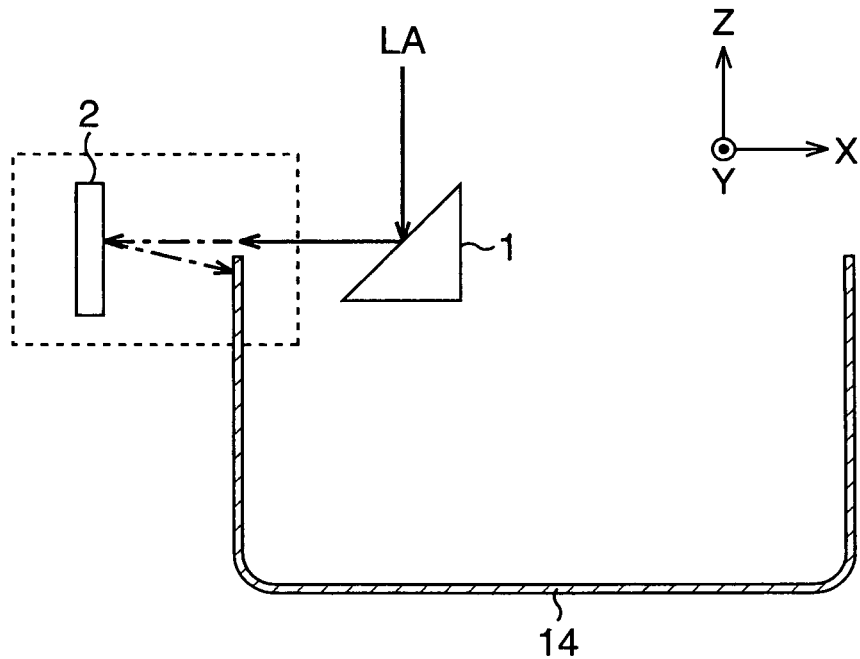
FIG. 7A is a view illustrating an example of a second reflection mirror 2.
Figure 7B:
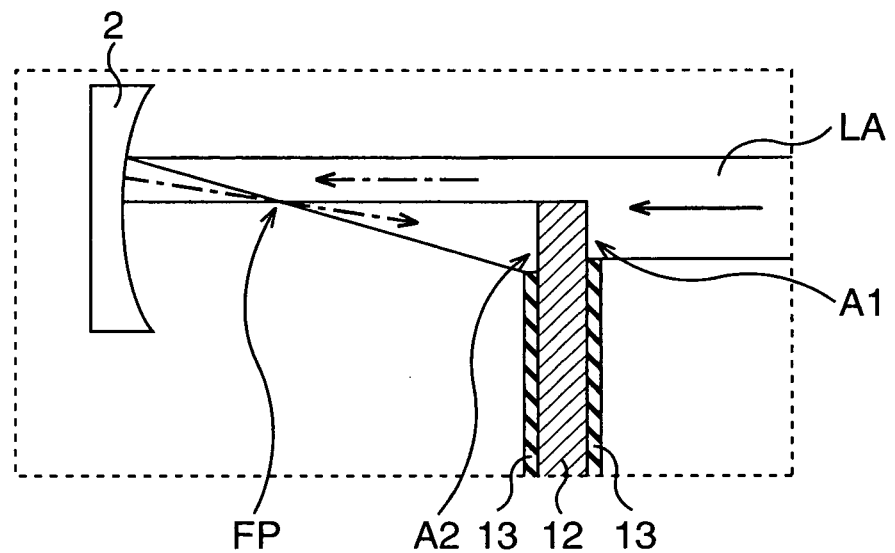
FIG. 7B is an enlarged view illustrating irradiation target portions in FIG. 7A.

Next, a mechanism for adjusting the reflection angle of the reflection mirror will be described. FIG. 7A is a view illustrating an example of the second reflection mirror 2, and FIG. 7B is an enlarged view illustrating the irradiation target portions irradiated with the laser beam LA at the upper edge portion 14a of the cup 14.

As described above, the second reflection mirror 2 reflects part, of the laser beam LA, passing above the first irradiation target portion A1 at the upper edge portion 14a of the cup 14 to be incident thereon, and guides the laser beam LA to the second irradiation target portion A2. In this example, as the second reflection mirror 2, a concave mirror (cylindrical mirror) having a curvature in the Z direction (height direction of the cup 14) is used. Further, its focal position FP is set so as to be between the second reflection mirror 2 and the second irradiation target portion A2.

According to the above structure, it is possible to reverse the laser beam LA reflected by the second reflection mirror 2 and appropriately irradiate the laser beam LA to the upper edge portion 14a of the cup 14. As for the laser beam LB, the second' reflection mirror 5 is preferably formed in the same shape. That is, the mechanism for adjusting the reflection angle adjusts the angle of the reflection mirror so that, for example, the focal position of the light reflected by the reflection mirror is located between the reflection mirror and the irradiation target portion of the cup 14.

Further, as for the other reflection mirrors, they are each preferably a concave mirror, a plane mirror, or a convex mirror depending on whether the laser beam incident on the reflection mirror is a diverging beam, a collimated beam, or a converging beam. Giving an appropriate curvature (concave surface, plane surface, convex surface) to the reflection mirror according to a propagation characteristic of the incident laser beam makes it possible to adjust the diameter of the laser beam reflected by the reflection mirror and irradiated to the upper edge portion 14a. Further, adjusting the diameter of the laser beam makes it possible to obtain a power density suitable for removing the resin film 13.

(Detection of Non-Irradiation of Laser Beam)

Next, details of the laser light-receiving elements 8 and 10 and the non-irradiation detecting parts 9 and 11 will be described. FIG. 8 is a side view of the cup 14 seen from its side surface. The cup 14 is a primary drawn material, and therefore, has variation in height h of the upper edge portion 14a, though a variation degree differs, as illustrated in FIG. 8. This is because ductility of the plate material containing the parent metal 12 has not a little anisotropy, which makes completely uniform working difficult at the time of the primary drawing.

In the first to third embodiments, the Z-direction position (the position in the height direction of the cup 14) of the irradiation target portion (the first irradiation target portion A1, the first' irradiation target portion B1, or the like) is fixed. Therefore, when the irradiation width W is smaller than the variation in the height h of the upper edge portion 14a, the laser beam LA, LB passes above the upper edge portion 14a in some case and the laser beam LA, LB is not irradiated to the upper most portion of the upper edge portion 14a in some other case. As a result, a laser non-irradiation portion C can sometimes occur. Continuing the processing with the laser non-irradiation portion C left occurring is likely to cause the generation of resin hairs.

Figure 9A:
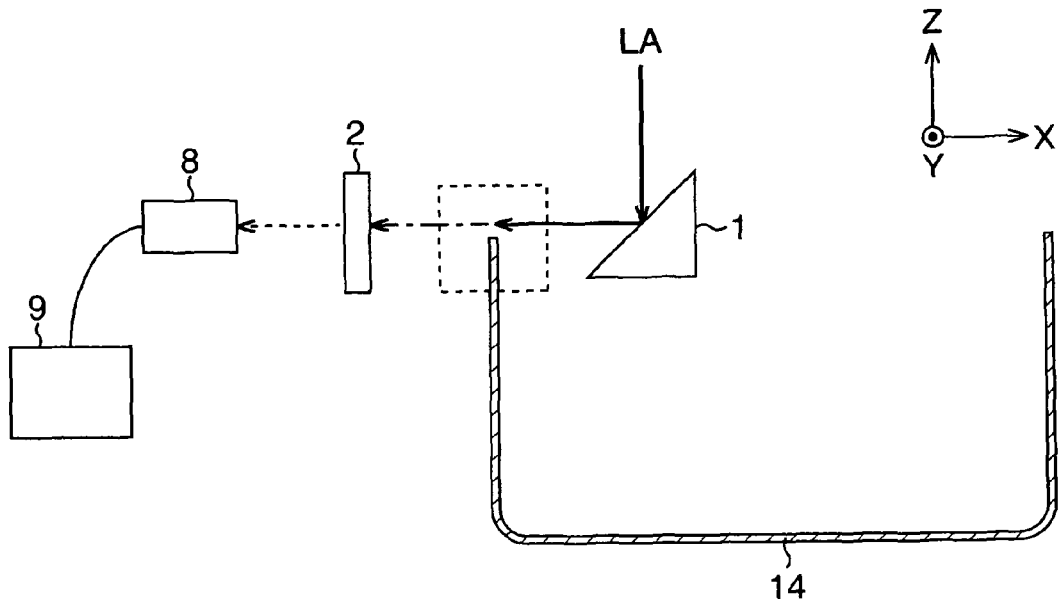
FIG. 9A is a view illustrating an example of a relation among a laser beam LA, a laser light-receiving element 8, and a non-irradiation detecting part 9.
Figure 9B:
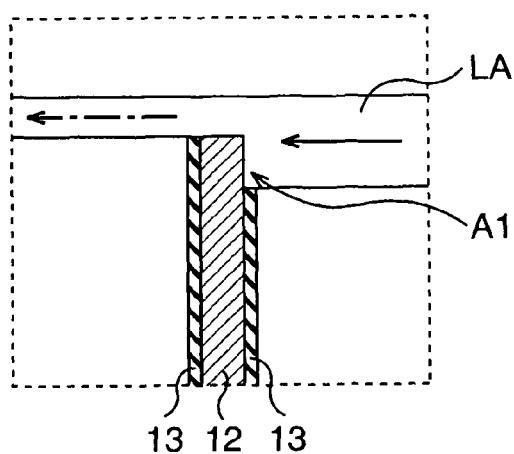
FIG. 9B is an enlarged view illustrating an irradiation target portion in FIG. 9A.
Figure 9C:
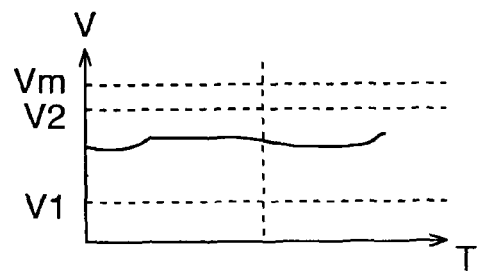
FIG. 9C is a chart representing a light intensity signal in the example illustrated in FIG. 9A.

Therefore, in these embodiments, the occurrence of the laser non-irradiation portion C is detected by using the laser light-receiving element 8, the non-irradiation detecting part 9, and so on. FIG. 9A is a view illustrating a state where part of the laser beam LA is irradiated to the upper edge portion 14a and the other part passes above the upper edge portion 14a. Further, FIG. 9B is an enlarged view illustrating the irradiation target portion irradiated with the laser beam LA at the upper edge portion 14a of the cup 14, and FIG. 9C is a chart representing an example of a light intensity signal output from the laser light-receiving element 8. Note that in the graph illustrated in FIG. 9C, the horizontal axis represents time and the vertical axis represents a voltage value of the light intensity signal.

As described above, the laser light-receiving element 8 detects the intensity of the laser beam LA that has transmitted through the second reflection mirror 2. Then, the laser light-receiving element 8 outputs the light intensity signal whose voltage is in proportion to the intensity. Further, the non-irradiation detecting part 9 analyzes the light intensity signal output from the laser light-receiving element 8 to detect that the laser beam LA is not irradiated to the second reflection mirror 2. The non-irradiation detecting part 9 outputs a non-irradiation detection signal when, for example, the light intensity signal input from the laser light-receiving element 8 falls out of a preset voltage signal range. An upper limit voltage V2 and a lower limit voltage V1 of the voltage signal range based on which it is determined that the non-irradiation is detected are 90% and 10%, respectively, of an output voltage Vm of the laser light-receiving element 8 at the time of the entrance of the laser beam LA to the second reflection mirror 2 in a case where the cup 14 does not stand in a light path of the laser beam LA. In other words, when the voltage value Vs of the light intensity signal satisfies "V2≥Vs≥V1", it is determined that the signal does not indicate the non-irradiation, that is, indicates the normal irradiation.

In the state illustrated in FIG. 9A, since part of the laser beam LA constantly transmits through the second reflection mirror 2 to enter the laser light-receiving element 8, the voltage value Vs satisfies "V2≥Vs≥V1" as illustrated in FIG. 9C, and the non-irradiation detection signal is not output.

Figure 10A:
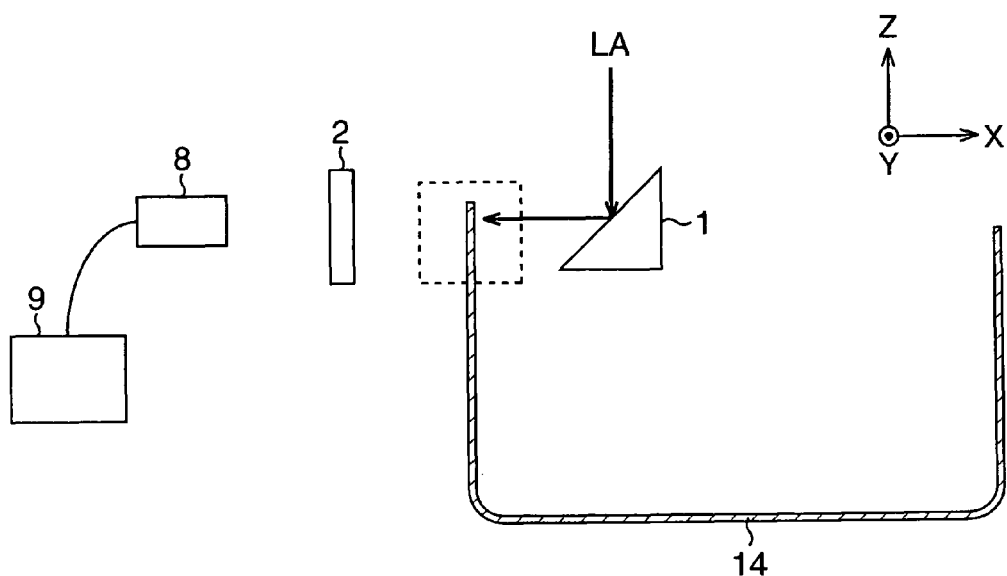
FIG. 10A is a view, illustrating another example of the relation among the laser beam LA, the laser light-receiving element 8, and the non-irradiation detecting part 9.
Figure 10B:
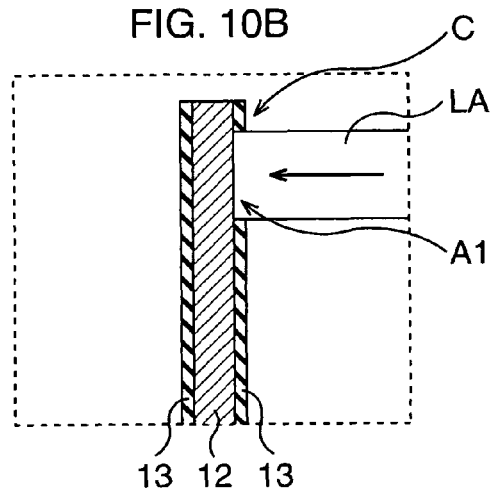
FIG. 10B is an enlarged view illustrating an irradiation target portion in FIG. 10A.
Figure 10C:
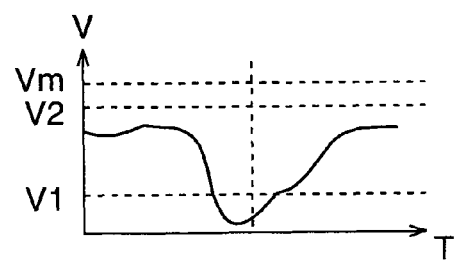
FIG. 10C is a chart representing a light intensity signal in the example illustrated in FIG. 10A.

On the other hand, when the upper edge portion 14a is too high and almost no laser beam LA passes the upper edge portion 14a as illustrated in FIG. 10A and FIG. 10B, an incident power of the laser beam LA to the second reflection mirror 2 greatly reduces, and as illustrated in FIG. 10C, the voltage value Vs of the light intensity signal becomes below the lower limit voltage V1. As a result, the non-irradiation detecting part 9 outputs the non-irradiation detecting signal, for example, a warning, indicating that the laser non-irradiation portion C has occurred. In the state illustrated in FIG. 10A and FIG. 10B, the resin film 13 at the first irradiation target portion A1 is removed, with the resin film 13 at the laser non-irradiation target portion C of the uppermost end portion of the cup 14 being left.

Figure 11A:
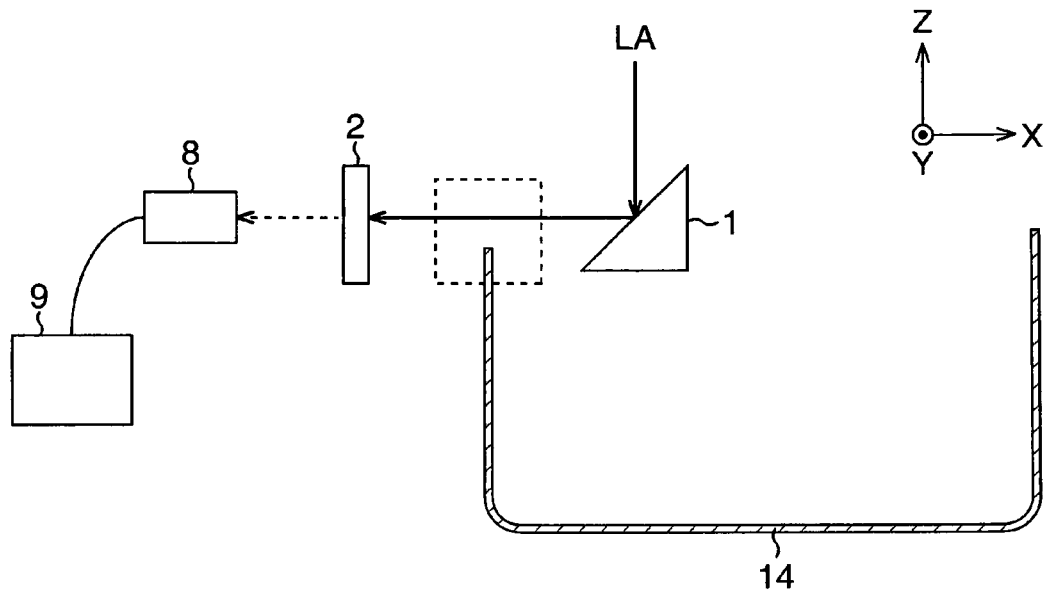
FIG. 11A is a view illustrating still another example of the relation among the laser beam LA, the laser light-receiving element 8, and the non-irradiation detecting part 9.
Figure 11B:
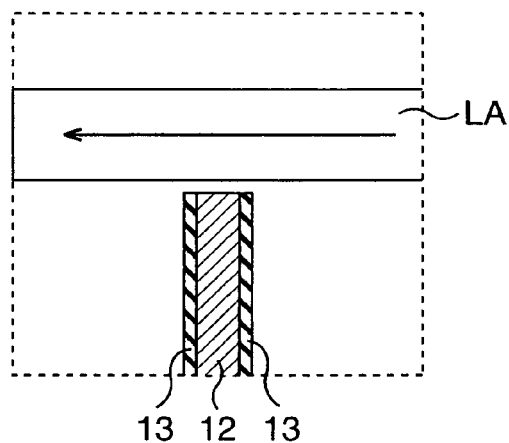
FIG. 11B is an enlarged view illustrating an irradiation target portion in FIG. 11A.
Figure 11C:
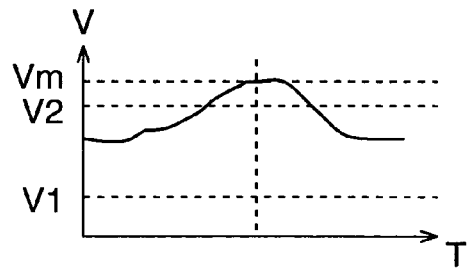
FIG. 11C is a chart representing a light intensity signal in the example illustrated in FIG. 11A.

Further, when the upper edge portion 14a is too low and the laser beam LA almost entirely passes the upper edge portion 14a as illustrated in FIG. 11A and FIG. 11B, the incident power of the laser beam LA to the second reflection mirror 2 increases, and as illustrated in FIG. 11C, the voltage value Vs of the light intensity signal becomes over the upper limit voltage V2. As a result, the non-irradiation detecting part 9 outputs the non-irradiation detecting signal, for example, a warning, indicating that the laser non-irradiation portion C has occurred. In the state illustrated in FIG. 11A and FIG. 11B, the resin film 13 is not removed on almost the entire upper edge portion 14a of the cup 14 and the laser non-irradiation portion C occurs.

As described above, by the non-irradiation detecting part 9 detecting a change in the light intensity signal output from the laser light-receiving element 8, it is possible to detect the occurrence of the laser non-irradiation portion C. Note that as for the laser beam LB, the laser light-receiving element 10, and the non-irradiation detecting part 11, the same operations as those for the laser beam LA, the laser light-receiving element 8, and the non-irradiation detecting part 9 are performed.

Further, the angle of the first reflection mirror 1, the first' reflection mirror 4, the second reflection mirror 2, or the second' reflection mirror 5 having a piezoelectric driving element, a motor, or the like may be adjusted by a feedback control part (not illustrated) by using the light intensity signal output from the laser light-receiving element 8 so that each of the laser beams LA, LB is irradiated to a desired position at the upper edge portion 14a of the cup 14. For example, by successively adjusting the mirror reflection angle so that the voltage of the light intensity signal falls within the upper and lower limit range, it is possible to further prevent the occurrence of the laser non-irradiation portion C.

As described hitherto, according to these embodiments, the laser beam LA or LB output from the light source and reflected by the first reflection mirror 1 or the first' reflection mirror 4 is irradiated to a plurality of places or is irradiated to the same place a plurality of times, in the upper edge portion 14a. Therefore, it is possible to improve use efficiency of the laser energy. This enables the full removal of the resin film 3 with a smaller laser power. Further, appropriately adjusting the Z coordinate of the irradiation target portion by adjusting the reflection angles of the reflection mirrors makes it possible to widen the irradiation width W. Therefore, even when there is a large variation in the height of the upper edge portion 14 of the cup 14, it is possible to prevent the occurrence of the laser non-irradiation portion C as much as possible. Further, even when the laser non-irradiation portion C occurs due to reasons such as an extremely large variation in the height of the upper edge portion 14a, it is possible to detect this. Therefore, it is possible to easily specify the cup 14 involving a possibility of the generation of the resin hair, and by excluding this cup 14, it is possible to eliminate a useless process and the like. This makes it possible to avoid reduction in yields, cost increase, and the like accompanying the occurrence of the resin hair in advance.

In the manufacture of a container such as a seamless can, the laser beam may be irradiated to the resin film 13 at the upper edge portion 14a of the side surface of the cup 14 by any of these laser processing apparatuses to evaporate the resin film at the upper edge portion 14a before the deep drawing of the cup 14.

The reflection mirrors included in these embodiments may be all reflection mirrors that are independently adjustable, but the reflection angles of the reflection mirrors may be fixed in advance so that the irradiation positions become appropriate, with the function of adjusting the reflection angle being omitted. Such a structure is especially effective when, for example, a large number of cups of the same type are processed. Further, the reflection mirrors each need not be independent, and they may be an integrated structure having a plurality of independent mirror surfaces. In this case, compared with the case where the adjusting mechanism is included, a possibility of the variation in the mirror reflection angle due to mechanical vibration or the like is eliminated as much as possible, so that more stable processing can be expected.

Further, optical fibers may guide the laser beams to the first reflection mirror 1 and the first' reflection mirror 4. Further, a target of the laser processing is not limited to the primary drawn material, and the present invention may be applicable to processing of an end portion of any of various cylinders.

Further, instead of rotating the cup 14, the reflection mirrors or the like may be relatively rotated.

Next, various experiments conducted by the present inventors will be described.

(First Experiment)

In a first experiment, a laser processing apparatus (example No. 1) with the same structure as that of the first embodiment was first produced. Further, a cup 14 worked from a plate material whose tin-plated steel plate (parent metal 12) has PET resin films (resin films 13) formed on both surfaces was produced. A diameter of the cup 14 was 100 mm and a thickness of the PET resin film was 20 μm. Then, regarding the example No. 1, a relation between a laser power and a thickness of the removed PET resin film was studied. Further, for comparison, a laser processing apparatus (comparative example) with the structure illustrated in FIG. 2A and FIG. 2B was also produced and the same study was conducted.

As a light source, one laser device outputting a $CO_2$ laser was used, and a laser power was varied in a 300 W to 2000 W range. Further, after a laser beam output from the laser device was focused by a focusing lens with a 500 mm focal length, the laser beam was equally split to laser beams LA and LB by a beam splitting mirror. Therefore, the laser power irradiated to the cup 14 was 150 W to 1000 W per surface. Further, focal points of lenses were set near a first irradiation target portion A1 and near a first' irradiation target portion B1, and a beam diameter at the focal position was set to about 2 mm. Further, a rotation speed of the cup 14 was set to 400 rpm. As all the first to third reflection mirrors 1 to 3 and first' to third' reflection mirrors 4 to 6, plane mirrors were used.

In the measurement of the thickness of the removed PET resin film, cross sections of the laser-irradiated portions were observed with a microscope and a thickness of a removed portion was calculated from an average thickness of the remaining PET resin film. The result is presented in FIG. 12.

Figure 2A:
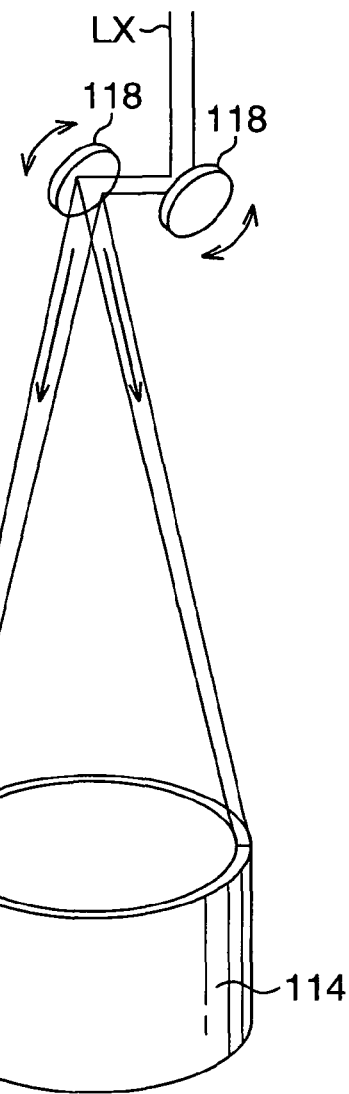
FIG. 2A is a view illustrating an example of a laser processing apparatus.
Figure 2B:
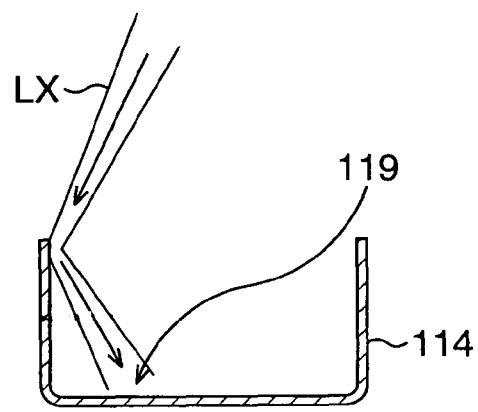
FIG. 2B is a view illustrating reflection of a laser beam.
Figure 12:
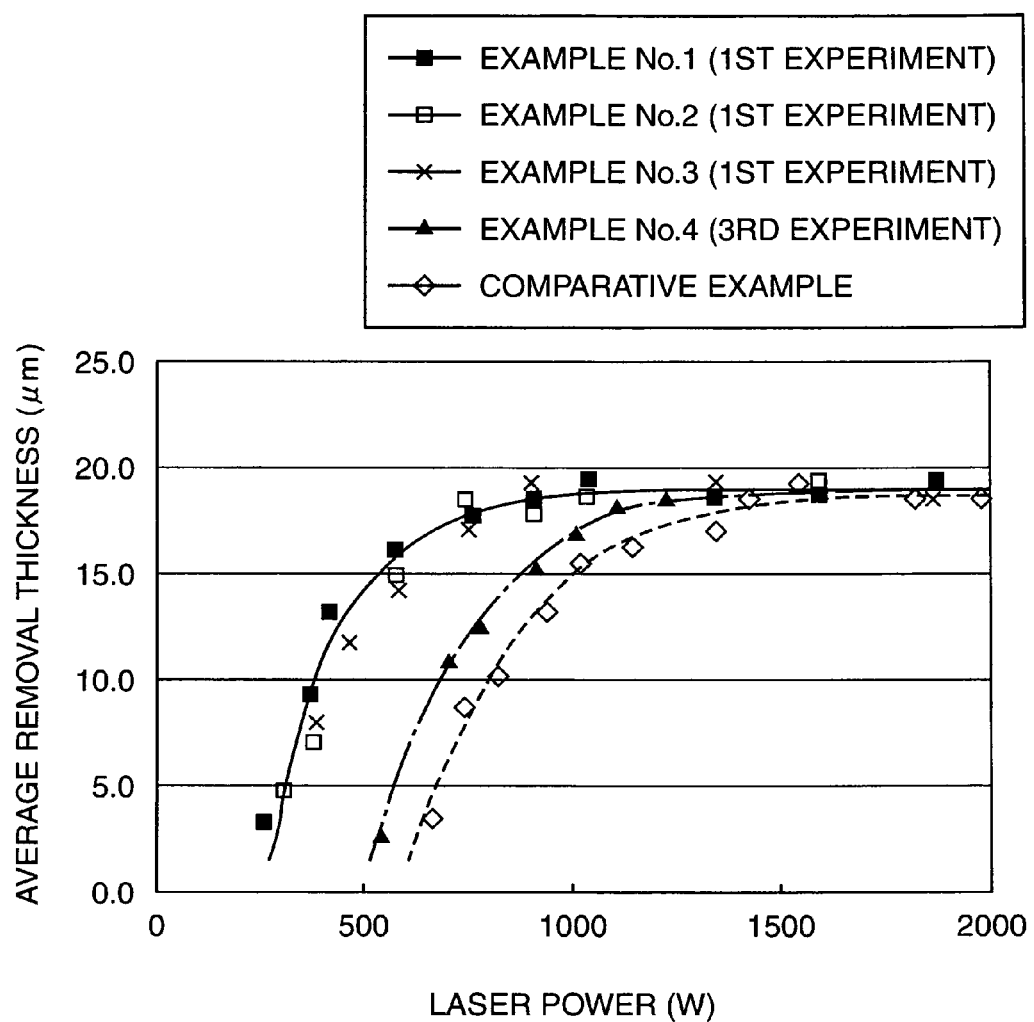
FIG. 12 is a chart representing results of a first experiment and a third experiment.

As presented in FIG. 12, when the laser processing apparatus illustrated in FIG. 2A and FIG. 2B was used, the laser power of about 1400 W was required in order to fully remove the PET resin film with a 20 μm thickness. On the other hand, according to the example No. 1, the laser power of about 900 W enabled the full removal of the PET resin film with a 20 μm thickness.

Further, a laser processing apparatus (example No. 2) with the same structure as that of the second embodiment was produced and the same study was conducted. The conditions except the arrangement of the reflection mirrors were the same as those of the example No. 1. The result is also presented in FIG. 12. As presented in FIG. 12, a relation between the laser power and the thickness of the removed PET resin film in the example No. 2 was the same as that of the example No. 1. That is, in the example No. 2 as well, the laser power of about 900 W enabled the full removal of the PET resin film with a 20 μm thickness.

Further, a laser processing apparatus (example No. 3) with the same structure as that of the third embodiment was produced and the same study was conducted. In the example No. 3, a laser beam was not split, and a laser power of about 300 W to 2000 W was made incident on a first reflection mirror 1. The other conditions were the same as those of the example No. 1. The result is also presented in FIG. 12. As presented in FIG. 12, a relation between the laser power and the thickness of the removed PET resin film in the example No. 3 was the same as that of the example No. 1 or No. 2. That is, in the example No. 3 as well, the laser power of about 900 W enabled the full removal of the PET resin film with a 20 μm thickness.

(Second Experiment)

In a second experiment, a study regarding the detection of the laser non-irradiation portion C in the example No. 1 was conducted. In this study, the upper limit voltage V2 and the lower limit voltage V1 were set to 90% and 10% of the output voltage Vm of the laser light-receiving element 8 respectively at the time of the entrance of the laser beam LA to the second reflection mirror 2 in a case where the cup 14 was not in the light path of the laser beam LA.

Then, the laser power of the light source was set to 900 W and 10000 cups 14 were subjected to the laser processing. As a result, at the time of the processing of the twenty cups 14, the non-irradiation detection signal was output. When these twenty cups 14 were subjected to redrawing and ironing which are post processes, the generation of resin hairs was confirmed in eighteen cups among them. On the other hand, when the 9980 cups 14 for which no non-irradiation detection signal was output were subjected to redrawing and ironing which are post processes, no resin hair was generated.

From these results, it has been verified that according to the first embodiment, it is possible to accurately detect a container involving a possibility of the generation of the resin hair.

(Third Experiment)

Figure 13:
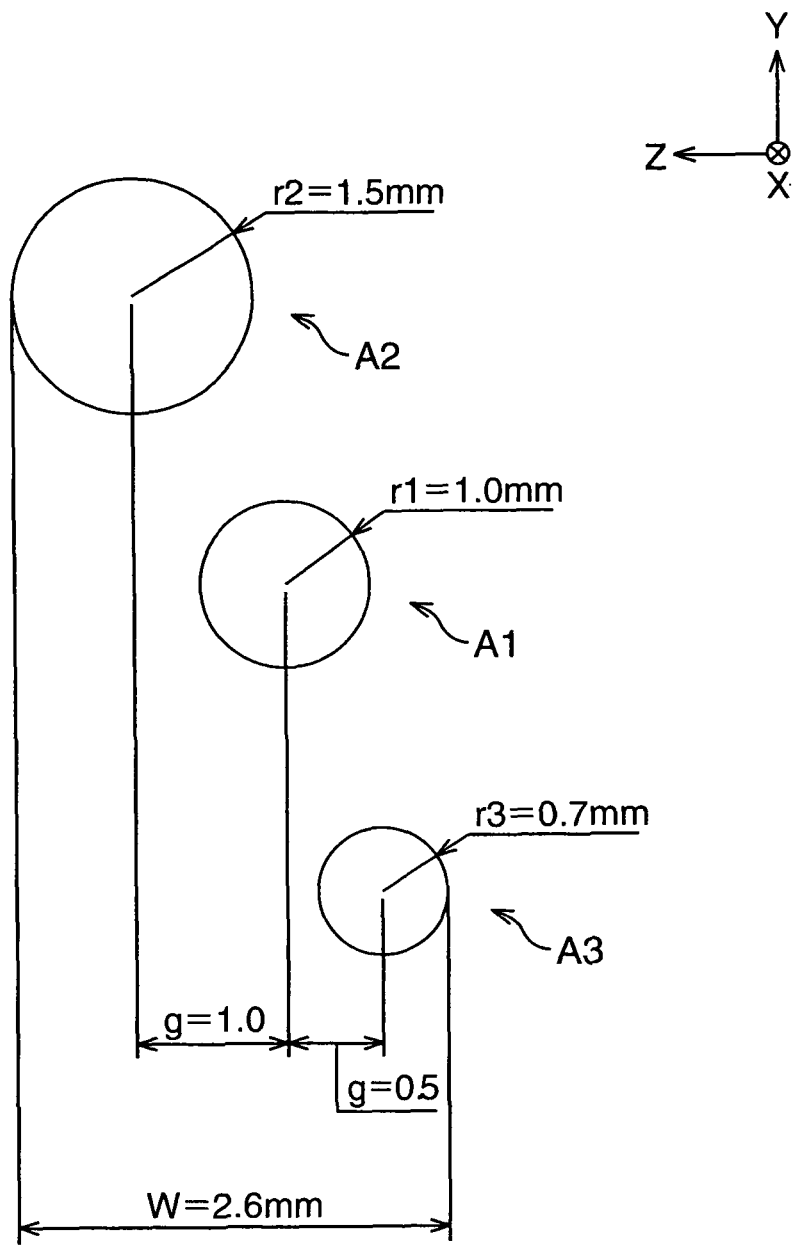
FIG. 13 is a chart representing a condition in the third experiment.

In a third experiment, a difference in the Z coordinate (Z-direction interval) in the example No. 2 was adjusted as illustrated in FIG. 13 by the mechanism for adjusting the reflection angle and the laser beam was irradiated. Here, a beam radius r at the first irradiation target portion A1 was set to 1.0 mm, a beam radius r2 at the second irradiation target portion A2 was set to 1.5 mm, and a beam radius r3 at the third irradiation target portion A3 was set to 0.7 mm. As illustrated in FIG. 13, in the Z direction, the third irradiation target portion A3, the first irradiation target portion A1, and the second irradiation target portion A2 were arranged from under in the order mentioned, and the Z-direction interval g between the third irradiation target portion A3 and the first irradiation target portion A1 was set to 0.5 mm, and the Z-direction interval g between the first irradiation target portion A1 and the second irradiation target portion A2 was set to 1.0 mm. Therefore, an effective irradiation width W was 2.6 mm.

Then, similarly to the first experiment, a relation between the laser power and the thickness of the removed PET resin film was studied. The result is presented in FIG. 12 as an example No. 4. As presented in FIG. 12, the laser power of about 1200 W enabled the sufficient removal of the PET resin film with a 20 μm thickness. Compared with the example No. 2 where the Z-direction interval g was set to 0 mm, a larger laser power was required, but this is because the laser beam was irradiated to a wider range. Nevertheless, compared with the comparative example, it was possible to reduce the necessary laser power.

Further, similarly to the second experiment, 10000 cups 14 were subjected to the laser processing also in the example No. 2. As a result, at the time of the processing of the three cups 14, the non-irradiation detection signal was output. When these three cups 14 were subjected to redrawing and ironing which are post processes, the generation of resin hairs was confirmed in two of them. On the other hand, when the 9997 cups 14 for which the non-irradiation detection signal was not output were subjected to redrawing and ironing which are post processes, no resin hair was generated.

From these results, it has been verified that according to the second embodiment, it is possible to accurately detect a container involving a possibility of the generation of the resin hair.

In the foregoing, the suitable embodiments of the present invention are described in detail with reference to the attached drawings, but the present invention is not limited to these examples. It is obvious that various changes and modifications within the scope of the technical idea as set forth in the claims are readily apparent to those having ordinary knowledge in the technical field to which the present invention belongs, and it is understood that these examples should also be naturally covered by the technical scope of the present invention.

INDUSTRIAL APPLICABILITY

The present invention is usable in a can manufacturing industry and the like, for instance.

The invention claimed is:

1. A laser processing apparatus, comprising:
    a first laser beam irradiator to direct a laser beam onto an inner surface at an end portion of a cylinder so as to make a first part of the laser beam contact the cylinder;
    a first reflector to reflect a second part of the laser beam, the second part having passed an outer side of the end portion onto an outer surface of the cylinder so as to make the reflected second part contact the cylinder; and
    a rotator to rotate the cylinder around a center of the cylinder relative to the first laser beam irradiator and the first reflector;
        wherein the end portion of the cylinder is disposed on a path of the laser beam from the first laser beam irradiator to the first reflector, and
        wherein the first part contacts the inner surface and at least a part of the reflected second part contacts the outer surface simultaneously.

2. The laser processing apparatus of claim 1, further comprising:
    a second reflector to reflect the first part having been reflected by the inner surface onto another part of the inner surface at the end portion so as to make the first part reflected by the second reflector contact the cylinder.

3. The laser processing apparatus of claim 1, further comprising:
    a second laser beam irradiator to direct a second laser beam onto the outer surface at the end portion of the cylinder so as to make a third part of the second laser beam contact the cylinder; and
    a second reflector to reflect a fourth part of the second laser beam, the fourth part having passed the outer side of the end portion onto the inner surface so as to make the reflected fourth part contact the cylinder.

4. The laser processing apparatus of claim 3, further comprising:
    a third reflector to reflect the first part having been reflected by the inner surface onto another part of the inner surface at the end portion so as to make the first part reflected by the third reflector contact the cylinder; and
    a fourth reflector to reflect the third part having been reflected by the outer surface onto another part of the outer surface at the end portion so as to make the third part reflected by the fourth reflector contact the cylinder.

5. The laser processing apparatus of claim 1, further comprising:
    a second laser beam irradiator to direct a second laser beam onto the outer surface at the end portion of the cylinder so as to make a third part of the second laser beam contact the cylinder,
        wherein the first reflector also reflects the third part having been reflected by the outer surface onto another part of the outer surface at the end portion so as to make the third part reflected by the first reflector contact the cylinder.

6. The laser processing apparatus of claim 5, further comprising:
    a second reflector to reflect the first part having been reflected by the inner surface onto another part of the inner surface at the end portion so as to make the first part reflected by the second reflector contact the cylinder, and
    to reflect a fourth part of the second laser beam, the fourth part having passed the outer side of the end portion, onto another part of the inner surface so as to make the reflected fourth part contact the cylinder.

7. The laser processing apparatus of claim 1, further comprising:
    a second reflector to reflect the first part having been reflected onto the outer surface by the first reflector and having been reflected by the outer surface onto another part of the outer surface at the end portion so as to make the first part reflected by the second reflector contact the cylinder.

8. The laser processing apparatus of claim 1, wherein the first reflector is a concave mirror, and wherein the concave mirror is disposed so as to cause a focal point of the first part reflected by the concave mirror to be located between the concave mirror and an irradiation target portion on the outer surface.

9. The laser processing apparatus of claim 1, further comprising:
an absorber to absorb the first part that travels toward a light source of the first laser beam irradiator after it is directed onto the inner surface by the first laser beam irradiator.

10. The laser processing apparatus of claim 1, further comprising:
a light detector to measure a light intensity of a transmission laser beam transmitted by a partial reflection mirror, which is the first reflector transmitting part of the incident laser beam.

11. A container manufacturing apparatus, comprising:
a laser processing apparatus, including:
a first laser beam irradiator to direct a laser beam onto an inner surface at an end portion of a cylinder so as to make a first part of the laser beam contact the cylinder;
a first reflector to reflect a second part of the laser beam, the second part having passed an outer side of the end portion onto an outer surface of the cylinder so as to make the reflected second part contact the cylinder; and
a rotator to rotate the cylinder around a center of the cylinder relative to the first laser beam irradiator and the first reflector;
wherein the end portion of the cylinder is disposed on a path of the laser beam from the first laser beam irradiator to the first reflector,
wherein the first part contacts the inner surface and at least a part of the reflected second part contacts the outer surface simultaneously,
wherein the cylinder is a cylindrical cup made of a metal plate having resin films on both surfaces, and
wherein the laser beam is directed onto the resin film at the upper edge portion of a side surface of the cup to evaporate the resin films at an upper edge portion.

12. A laser processing apparatus, comprising:
a first laser beam irradiator to direct a laser beam onto an outer surface at an end portion of a cylinder so as to make a first part of the laser beam contact the cylinder;
a first reflector to reflect a second part of the laser beam, the second part having passed an outer side of the end portion onto an inner surface of the cylinder so as to make the reflected second part contact the cylinder; and
a rotator to rotate the cylinder around a center of the cylinder relative to the first laser beam irradiator and the first reflector;
wherein the end portion of the cylinder is disposed on a path of the laser beam from the first laser beam irradiator to the first reflector, and
wherein the first part contacts the outer surface and at least a part of the reflected second part contacts the inner surface simultaneously.

13. The laser processing apparatus of claim 12, further comprising:
a second reflector to reflect the first part having been reflected by the outer surface onto another part of the outer surface at the end portion so as to make the first part reflected by the second reflector contact the cylinder.

14. The laser processing apparatus of claim 12, further comprising:
a second laser beam irradiator to direct a second laser beam onto the inner surface at the end portion of the cylinder so as to make a third part of the second laser beam contact the cylinder; and
a second reflector to reflect a fourth part of the second laser beam, the fourth part having passed the outer side of the end portion onto the outer surface so as to make the reflected fourth part contact the cylinder.

15. The laser processing apparatus of claim 14, further comprising:
a third reflector to reflect the first part having been reflected by the outer surface onto another part of the outer surface at the end portion so as to make the first part reflected by the third reflector contact the cylinder; and
a fourth reflector to reflect the third part having been reflected by the inner surface onto another part of the inner surface at the end portion so as to make the third part reflected by the fourth reflector contact the cylinder.

16. The laser processing apparatus of claim 12, further comprising:
a second laser beam irradiator to direct a second laser beam onto the inner surface at the end portion of the cylinder so as to make a third part of the second laser beam contact the cylinder,
wherein the first reflector also reflects the third part having been reflected by the inner surface onto another part of the inner surface at the end portion so as to make the third part reflected by the first reflector contact the cylinder.

17. The laser processing apparatus of claim 16, further comprising:
a second reflector to reflect the first part having been reflected by the outer surface onto another part of the outer surface at the end portion so as to make the first part reflected by the second reflector contact the cylinder, and
to reflect a fourth part of the second laser beam, the fourth part having passed the outer side of the end portion, onto another part of the outer surface so as to make the reflected fourth part contact the cylinder.

18. The laser processing apparatus of claim 12, further comprising:
a second reflector to reflect the first part having been reflected onto the inner surface by the first reflector and having been reflected by the inner surface onto another part of the inner surface at the end portion so as to make the first part reflected by the second reflector contact the cylinder.

19. The laser processing apparatus of claim 12, wherein the first reflector is a concave mirror, and wherein the concave mirror is disposed so as to cause a focal point of the first part reflected by the concave mirror to be located between the concave mirror and an irradiation target portion on the inner surface.

20. The laser processing apparatus of claim 12, further comprising:
an absorber to absorb the first part that travels toward a light source of the first laser beam irradiator after it is directed onto the outer surface by the first laser beam irradiator.

21. The laser processing apparatus of claim 12, further comprising:
a light detector to measure a light intensity of a transmission laser beam transmitted by a partial reflection mirror, which is the first reflector transmitting part of the incident laser beam.

22. A container manufacturing apparatus, comprising:
a laser processing apparatus, including:
- a first laser beam irradiator to direct a laser beam onto an outer surface at an end portion of a cylinder so as to make a first part of the laser beam contact the cylinder;
- a first reflector to reflect a second part of the laser beam, the second part having passed an outer side of the end portion onto an inner surface of the cylinder so as to make the reflected second part contact the cylinder; and
- a rotator to rotate the cylinder around a center of the cylinder relative to the first laser beam irradiator and the first reflector;
  - wherein the end portion of the cylinder is disposed on a path of the laser beam from the first laser beam irradiator to the first reflector,
  - wherein the first part contacts the outer surface and at least a part of the reflected second part contacts the inner surface simultaneously,
  - wherein the cylinder is a cylindrical cup made of a metal plate having resin films on both surfaces, and
  - wherein the laser beam is directed onto the resin film at the upper edge portion of a side surface of the cup to evaporate the resin films at an upper edge portion.

* * * * *